United States Patent
Pendharkar et al.

(10) Patent No.: US 11,137,926 B1
(45) Date of Patent: Oct. 5, 2021

(54) SYSTEMS AND METHODS FOR AUTOMATIC STORAGE TIERING

(71) Applicant: Veritas Technologies LLC, Mountain View, CA (US)

(72) Inventors: Niranjan Pendharkar, Pune (IN); Anindya Banerjee, Pune (IN); Naveen Ramachandrappa, San Jose, CA (US); Ramya Mula, San Jose, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 7 days.

(21) Appl. No.: 15/941,926

(22) Filed: Mar. 30, 2018

(51) Int. Cl.
*G06F 12/00* (2006.01)
*G06F 13/00* (2006.01)
*G06F 3/06* (2006.01)
*G06N 20/00* (2019.01)

(52) U.S. Cl.
CPC .......... *G06F 3/0647* (2013.01); *G06F 3/0611* (2013.01); *G06F 3/0653* (2013.01); *G06F 3/0683* (2013.01); *G06N 20/00* (2019.01)

(58) Field of Classification Search
CPC .... G06F 3/0647; G06F 3/0611; G06F 3/0653; G06F 3/0683; G06N 20/00
USPC ........................................................ 711/117
See application file for complete search history.

(56) References Cited

U.S. PATENT DOCUMENTS

| | | | | |
|---|---|---|---|---|
| 8,001,327 B2* | 8/2011 | Mimatsu | ............... | G06F 16/119 711/117 |
| 8,429,346 B1* | 4/2013 | Chen | ..................... | G06F 3/0613 709/213 |
| 8,484,259 B1* | 7/2013 | Makkar | ................. | G06F 16/907 707/827 |
| 8,782,369 B2* | 7/2014 | Baderdinni | ............ | G06F 3/061 711/103 |
| 8,966,216 B1* | 2/2015 | Marshak | ............... | G06F 3/0619 711/170 |
| 9,256,381 B1* | 2/2016 | Fultz | ..................... | G06F 16/185 |
| 9,459,809 B1* | 10/2016 | Chen | ..................... | G06F 3/0644 |
| 9,658,983 B1* | 5/2017 | Barber | .................. | G06F 16/219 |
| 9,697,247 B2 | 7/2017 | Vijayrao et al. | | |
| 9,703,664 B1* | 7/2017 | Alshawabkeh | ..... | G06F 11/3414 |
| 9,727,522 B1* | 8/2017 | Barber | .................. | G06F 9/5016 |

(Continued)

OTHER PUBLICATIONS

Veritas Access: Scale-out NAS software defined storage, Veritas Technologies LLC.

(Continued)

*Primary Examiner* — Sheng Jen Tsai
(74) *Attorney, Agent, or Firm* — FisherBroyles, LLP (57) ABSTRACT

The disclosed computer-implemented method for automatic storage tiering may include (1) receiving characteristics of previous accesses to storage system objects stored in a data storage system including multiple storage tiers, (2) generating, based on the characteristics of previous accesses to the storage system objects, a model that predicts characteristics of future accesses to the storage system objects, (3) selecting, based on the model, a next storage tier of the multiple storage tiers for each of the storage system objects, and (4) relocating at least some of the storage system objects from a current storage tier to the next storage tier selected for each of the at least some of the storage system objects. Various other methods, systems, and computer-readable media are also disclosed.

19 Claims, 7 Drawing Sheets

(56) References Cited

U.S. PATENT DOCUMENTS

| | | | | |
|---|---|---|---|---|
| 9,864,533 | B2* | 1/2018 | O'Brien | G06F 3/065 |
| 2013/0103378 | A1* | 4/2013 | Tinnakornsrisuphap | |
| | | | | B60L 53/63 |
| | | | | 703/18 |
| 2014/0006465 | A1* | 1/2014 | Davis | G06F 16/182 |
| | | | | 707/827 |
| 2016/0134934 | A1* | 5/2016 | Jared | G06Q 30/0203 |
| | | | | 725/14 |
| 2017/0046091 | A1* | 2/2017 | Antony | G06F 3/0659 |
| 2018/0329712 | A1* | 11/2018 | Palani | G06F 12/0868 |
| 2018/0357246 | A1* | 12/2018 | Strogov | G06F 16/113 |
| 2018/0373722 | A1* | 12/2018 | Ulasen | G06N 20/00 |
| 2019/0121673 | A1* | 4/2019 | Gold | G06F 9/4881 |
| 2019/0121889 | A1* | 4/2019 | Gold | G06F 16/2255 |
| 2019/0220217 | A1* | 7/2019 | Kimmel | G06F 3/0604 |
| 2019/0370832 | A1* | 12/2019 | Utsumi | G06Q 10/04 |

OTHER PUBLICATIONS

Veritas InfoScale Enterprise for Oracle Real Appplication Clusters (RAC): Manageability and availability for Oracle RAC databases, Veritas Technologies LLC.

* cited by examiner

SYSTEMS AND METHODS FOR AUTOMATIC STORAGE TIERING

BACKGROUND

Many large data storage systems employ a tiered storage framework, in which each file or other individually accessible portion of data may be stored in one of a number of nonvolatile storage tiers provided by the data storage system (e.g., within a single namespace), with each tier providing an associated data capacity, data transfer rate, cost per unit of storage, and other characteristics. In at least some conventional tiered data storage systems, the data storage tiers may range from a relatively fast, small, and expensive tier (e.g., including one or more local solid-state disk (SSD) devices), to a relatively large, slow, and inexpensive tier (e.g., including remote archival storage devices). Other intermediate tiers, such as those that employ local magnetic (hard) disk drive (HDD) devices, cloud-based storage devices, and the like, may also be utilized, possibly resulting in a variety of integrated data storage technologies that serve a range of needs for a single user or a group of users.

In some tiered storage systems, the customer may exert some control over which files or other storage system objects are stored in, or relocated to, which storage tiers. Typically, such control may be implemented by way of one or more configurable storage policies. In such systems, the customer may manually set parameters (e.g., minimum and/or maximum threshold values) so that various tiers are associated with particular characteristics of the files (e.g., most recent file access time, most recent file modification time, file access "temperature" or frequency, file size, file type, and/or the like).

SUMMARY

As will be described in greater detail below, the instant disclosure describes various systems and methods for automatic storage tiering. In one embodiment, a method for automatic storage tiering may include (1) receiving characteristics of previous accesses to storage system objects stored in a data storage system including multiple storage tiers, (2) generating, based on the characteristics of previous accesses to the storage system objects, a model that predicts characteristics of future accesses to the storage system objects, (3) selecting, based on the model, a next storage tier of the multiple storage tiers for each of the storage system objects, and (4) relocating at least some of the storage system objects from a current storage tier to the next storage tier selected for each of at least some of the storage system objects. In some embodiments, the model may further predict at least one time period of reduced activity load on the data storage system, and relocating at least some of the storage system objects may occur during the time period.

In some examples, receiving the characteristics of previous accesses to the storage system objects may include issuing file-listing commands, and the characteristics of previous accesses to the storage system objects may include, for each of at least some of the storage system objects, at least one of (1) a last access time for the storage system object or (2) a last modification time for the storage system object. In some embodiments, receiving the characteristics of previous accesses to the storage system objects may include receiving data from a least one of (1) a file change log or (2) an intelligent infrastructure management system, and the characteristics of previous accesses to the storage system objects may include, for each of at least some of the previous accesses of at least some of the storage system objects, at least one of (1) a timestamp indicating when the previous access occurred, (2) an identity of an entity that initiated the previous access, or (3) an amount of data transferred during the previous access. In yet other examples, receiving the characteristics of previous accesses to the storage system objects may include issuing operating system monitoring commands, and the characteristics of previous accesses to the storage system objects may include statistics describing previous activity involving at least one of (1) virtual memory, (2) file systems, or (3) data storage devices.

In some embodiments, the model may be generated using a first machine learning algorithm, and output of the model may be employed as input to a second machine learning algorithm different from the first machine learning algorithm. In some examples, the first machine learning algorithm may include an unsupervised pattern prediction algorithm that (1) learns, based on at least some of the characteristics of previous accesses to the storage system objects, previous access patterns to the storage system objects, and (2) generates the model based on the previous access patterns to the storage system objects. Further, in some embodiments, the method may include processing at least some of the characteristics of previous accesses to the storage system object to generate time series data as input for the first machine learning algorithm. Moreover, in some examples, processing at least some of the characteristics of previous accesses to the storage system objects may include supplying data missing from the characteristics of previous accesses to the storage system objects. In some embodiments, supplying data missing from the characteristics of previous accesses may include supplying average data values for at least some of the data missing from the characteristics of previous accesses.

The first machine learning algorithm, in some examples, may include at least one of a deep neural network or a recurrent neural network. Also, in some embodiments, the first machine learning algorithm may update the model after each of a plurality of time periods based on the characteristics of previous accesses to the storage system objects over the corresponding time period of the plurality of time periods.

In some examples, the second machine learning algorithm may group the storage system objects into a number of groups based on the characteristics of future accesses to the storage system objects. Further, in some embodiments, the characteristics of future accesses to the storage system objects may include a number of predicted accesses for each of the storage system objects during a future time period. In some examples, the number of groups may be equal to a number of tiers of the multiple storage tiers of the data storage system in which the storage system objects are to be stored. In some embodiments, the second machine learning algorithm may determine the number of groups. The second machine learning algorithm, in some examples, may include a k-means clustering algorithm.

The storage system objects, in at least some examples, may include at least one of (1) data blocks, (2) data objects, (3) files, (4) portions of files, or (5) file directories.

In one example, a system for automatic storage tiering may include several modules stored in memory, including (1) a statistics collection module that receives characteristics of previous accesses to storage system objects stored in a data storage system including multiple storage tiers, (2) a model generation module that generates, based on the characteristics of previous accesses to the storage system objects, a model that predicts characteristics of future accesses to the storage system objects, (3) a tier selection module that selects, based on the model, a next storage tier of the multiple storage tiers for each of the storage system objects; and (4) a relocation module that relocates at least some of the storage system objects from a current storage tier to the next storage tier selected for each of at least some of the storage system objects. The system may also include at least one physical processor that executes the statistics collection module, the model generation module, the tier selection module, and the relocation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive characteristics of previous accesses to storage system objects stored in a data storage system including multiple storage tiers, (2) generate, based on the characteristics of previous accesses to the storage system objects, a model that predicts characteristics of future accesses to the storage system objects, (3) select, based on the model, a next storage tier of the multiple storage tiers for each of the storage system objects, and (4) relocate at least some of the storage system objects from a current storage tier to the next storage tier selected for each of at least some of the storage system objects.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for automatic storage tiering. As will be explained in greater detail below, by receiving characteristics of previous accesses to storage system objects in a multiple-tier data storage system, and predicting characteristics of future accesses for the objects based on the previous access characteristics, the predicted characteristics may be used to select a new storage tier for at least some of the objects, and to relocate those objects to their new tiers. In doing so, the storage system objects may be automatically stored in tiers according to their expected future access patterns. In performing these operations on an ongoing basis, the system and methods presented herein may continually and automatically maintain alignment of the objects with their most appropriate storage tiers, thus negating the need to manually update parameters for configurable, but otherwise static, storage policies.

Moreover, the systems and methods described herein may improve the functioning and/or performance of a computer system that employs a multiple-tier data storage system by automatically updating the particular tiers in which the various data storage objects reside, substantially in real time, thus potentially reducing unwanted data access latency in the system in a manner that is unlikely to be obtained with manual setting of storage policy parameters. These systems and methods may also improve at least the technical fields of data storage and network computing by facilitating more efficient use of data storage and network communication resources, by way of reducing accesses to lower-tier (e.g., networked and long-term) storage resources while directing more frequent accesses to higher-tier (e.g., local and faster) storage devices.

Figure 1:
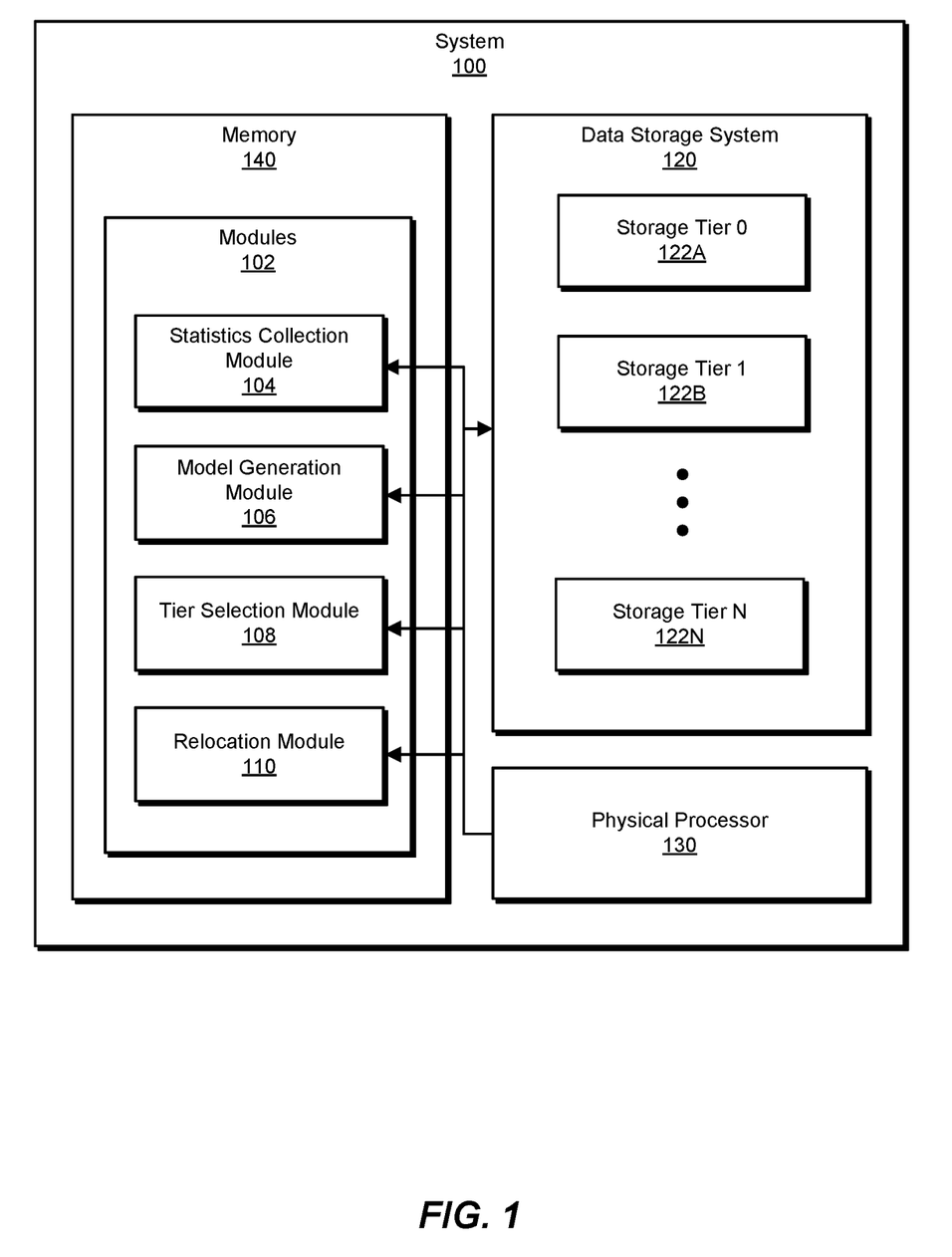
FIG. 1 is a block diagram of an example system for automatic storage tiering.
Figure 2:
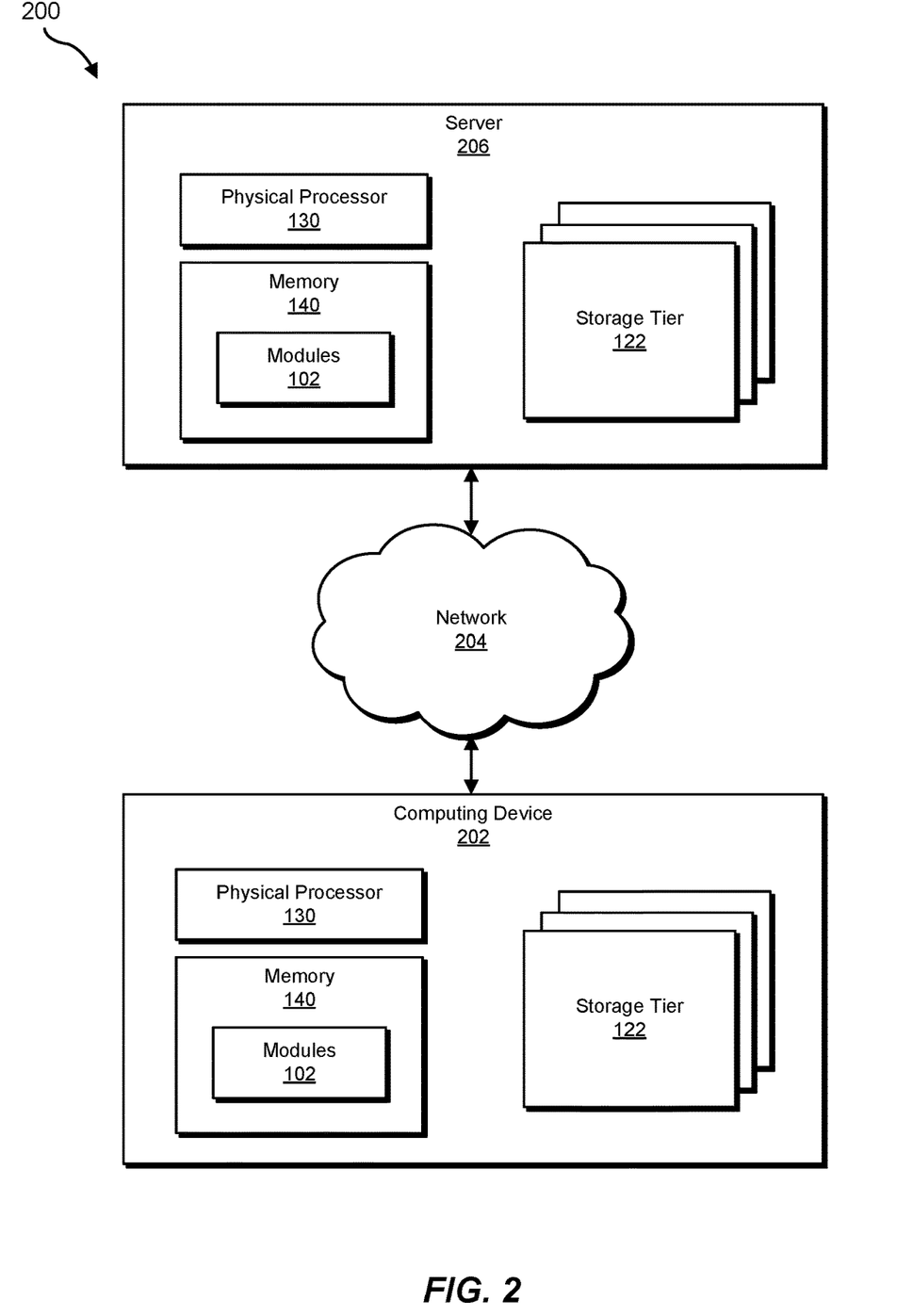
FIG. 2 is a block diagram of an additional example system for automatic storage tiering.
Figure 3:
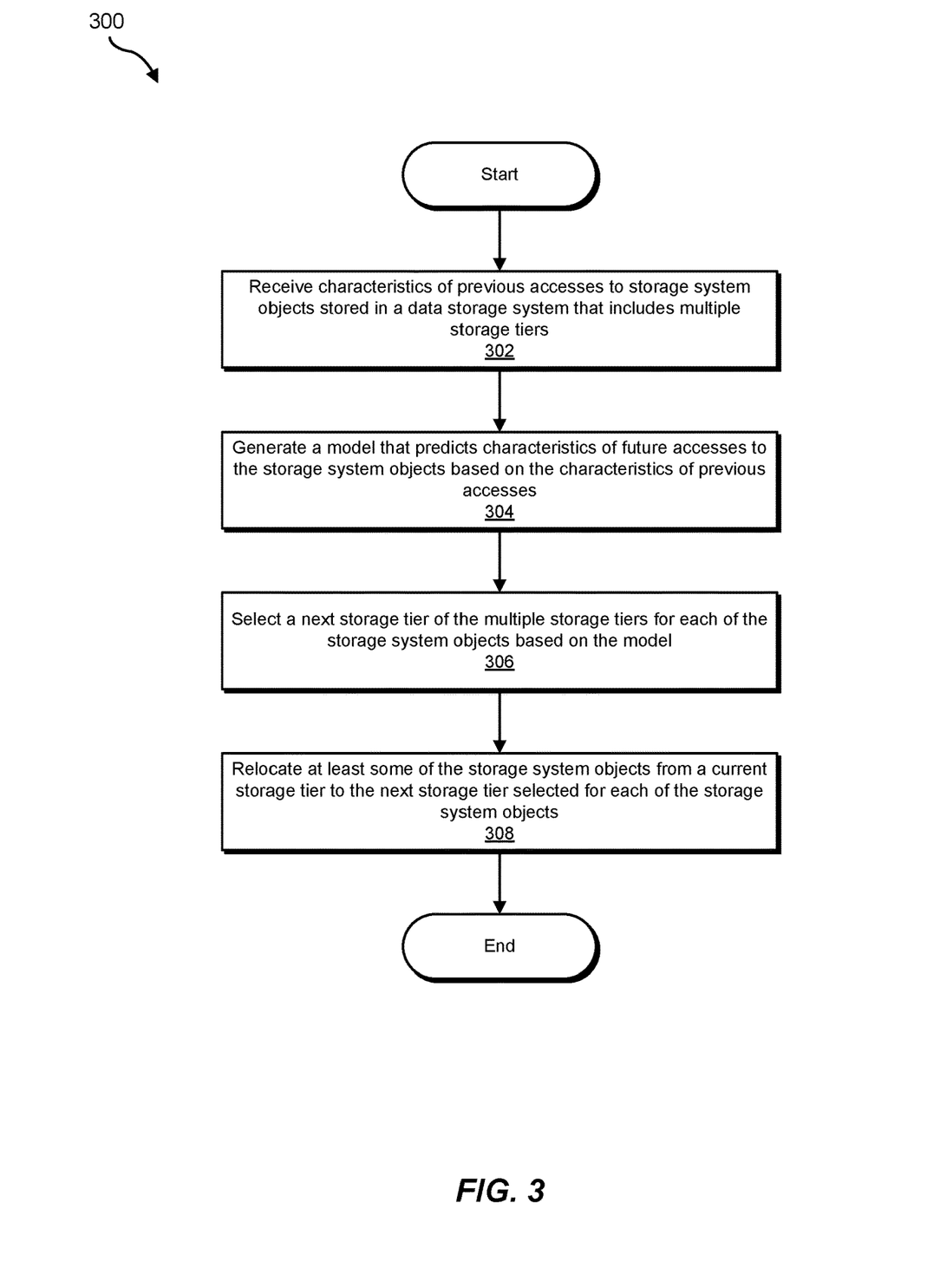
FIG. 3 is a flow diagram of an example method for automatic storage tiering.

The following will provide, with reference to FIGS. 1-2, detailed descriptions of example systems for automatic storage tiering. Detailed descriptions of corresponding computer-implemented methods will also be provided in connection with FIG. 3. In addition, detailed descriptions of example operations associated with the systems and methods of FIGS. 1-3 are presented in conjunction with FIGS. 4-7.

As employed herein, the term "storage system object" may generally refer to any unit or structure of data that is individually accessible from a data storage system. For example, storage system objects may include files, portions of files, and/or file directories (as denoted by "inodes" in Unix®-based systems) (e.g., employed to store documents and other types of data in typical file-level data storage systems), data blocks (e.g., utilized to store physical blocks of some set size on storage devices in block-level storage systems), and data objects (e.g., used to store photos, songs, and unstructured data in object-level storage systems). Consequently, storage system objects, as individually accessible units, may be assigned or stored to particular data storage tiers, as described more fully below.

FIG. 1 is a block diagram of an example system 100 for automatic storage tiering. As illustrated in this figure, example system 100 may include one or more modules 102 for performing one or more tasks. As will be explained in greater detail below, modules 102 may include a statistics collection module 104, a model generation module 106, a tier selection module 108, and a relocation module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate automatic storage tiering. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include a data storage system 120 including two or more storage tiers 122 (labeled Storage Tier 0 122A, Storage Tier 1 122B, . . . , and Storage Tier N 122N). Each storage tier 122, in some embodiments, may possess different storage characteristics, possibly including, but not limited to, average access time, average latency, average data rate, average cost per unit of data, and the like. Consequently, each storage tier 122 may be implemented using appropriate data storage technologies for that storage tier 122. For example, higher storage tiers 122 (e.g., Storage Tier 0 122A and/or Storage Tier 122B) may employ faster and/or more expensive devices (e.g., locally-positioned SSDs and HDDs), while lower storage tiers 122 (e.g., Storage Tier N 122N and/or others) may use slower and/or less expensive devices (e.g., public or private cloud storage, remotely-located long-term or archival storage systems, and so on). In some examples, data storage system 120 may include three to five storage tiers 122. However, fewer or greater numbers of storage tiers 122 may be included in data storage system 120 in other embodiments.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. Additionally, in some embodiments, storage tiers 122 of data storage system 120 may reside completely in computing device 202 or in server 206, or may be distributed in some fashion between computer device 202 and server 206. As will be described in greater detail below, one or more of modules 102 from FIG. 1 may, when executed by at least one processor of computing device 202 and/or server 206, enable computing device 202 and/or server 206 to provide automatic storage tiering for storage system objects, such as files, file directories, data blocks, data objects, and/or the like.

Computing device 202 generally represents any type or form of computing device capable of reading computer-executable instructions. An example of computer device 202 may be a personal computer that may include one or more SDDs, HDDs, or other data storage devices that may serve as higher storage tiers 122. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that may facilitate access to one or more storage tiers 122 of data storage system 120 to computer device 202 via network 204. In one example, server 206 may be a storage server (e.g., a cloud storage server, a data archival server, and/or so on) that provides access to storage devices or systems that may serve as lower storage tiers 122. Additional examples of server 206 include, without limitation, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for automatic storage tiering. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, in some embodiments, one or more of the systems described herein may receive characteristics of previous accesses to storage system objects (e.g., files, file directories, data blocks, data objects, and/or other stored types of data, as discussed above) in a data storage system (e.g., data storage system 120) that includes multiple storage tiers (e.g., storage tiers 122). At step 304, in some examples, one or more of the systems may generate a model that predicts characteristics of future accesses to the storage system objects based on the characteristics of the previous accesses. At step 306, one or more of the systems may select a next storage tier of the multiple storage tiers for each of the storage system objects based on the model. At step 308, one or more of the systems may relocate at least some of the storage system objects from a current storage tier to the next storage tier selected for each of the storage system objects. In some examples, as part of system 100 or 200, statistics collection module 104 may perform step 302, model generation module 106 may perform step 304, tier selection module 108 may perform step 306, and relocation module 110 may perform step 308.

Figure 4:
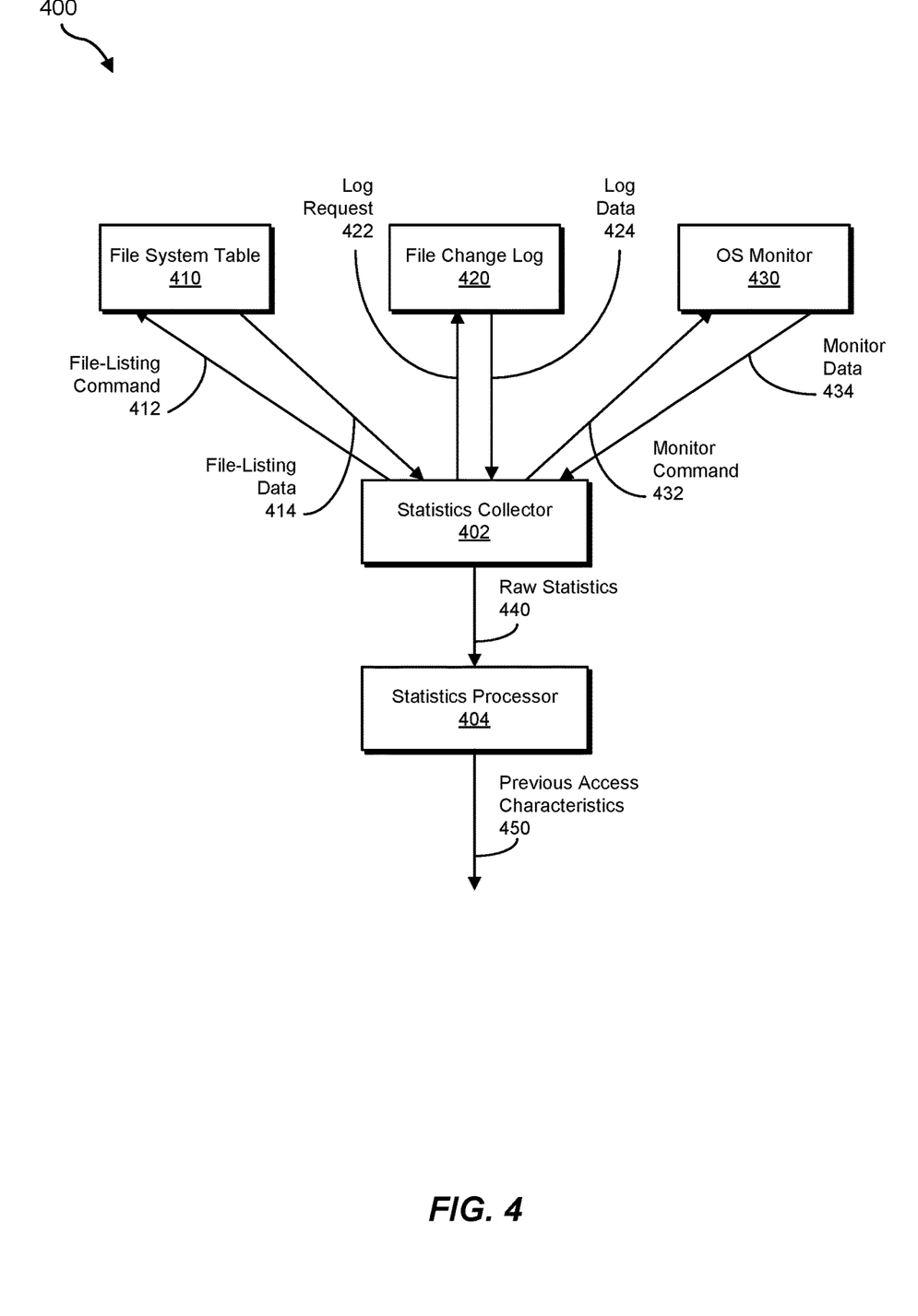
FIG. 4 is a flow diagram of example operations for collecting and processing statistics regarding characteristics of previous accesses of storage system objects.

The systems 100 or 200 described herein, possibly by way of statistics collection module 104, may perform step 302 in a variety of ways. FIG. 4 is a flow diagram of example operations 400 for collecting and processing statistics regarding characteristics of previous accesses of storage system objects. As depicted in FIG. 4, operations 400 may include the use of a statistics collector 402 and a statistics processor 404, which in some examples may be incorporated in statistics collection module 104. In some embodiments, statistics collector 402 may retrieve, obtain, or otherwise receive statistics regarding characteristics of previous accesses to storage system objects stored in various storage tiers 122 of data storage system 120. In some examples, statistics collector 402 may receive the characteristics from one or more different statistics sources, possibly including, but not limited to, a file system table 410, a file change log 420 (or, additionally or alternatively, an intelligent infrastructure management system), and/or an operating system (OS) monitor 430. In some examples, one or more of file system table 410, file change log 420, and/or OS monitor 430 may be hosted by an OS of system 100 or 200, or some other subsystem supported by the OS.

As illustrated in FIG. 4, statistics collector 402 may issue one or more file-listing commands 412 (e.g., the Unix® "ls" command) to the OS. In response, the OS of system 100 or 200 may return file-listing data 414 from file system table 410 and/or other sources that describe various characteristics of each storage system object (e.g., a file or file directory). These characteristics may include, for example, a file (or other storage system object) name, a file type, a file size, a last access time for the file, and/or a last modification time for the file.

In some embodiments, statistics collector 402 may send one or more log requests 422 to the OS or related system that returns log data 424 in response, which may be stored in file change log 420, a log of an intelligent infrastructure management system, or another data storage transaction logging system. In some examples, for each storage system object access, log data 424 may include, but is not limited to, a timestamp indicating when the access occurred, an identity of an entity (e.g., a username, an account number, or the like) that initiated the access, and/or an amount of data transferred during the access for each transaction or access to each of one or more storage system objects.

Statistics collector 402, in some examples, may issue one or more monitor commands 432 to OS monitor 430 that may provide monitor data 434 in response thereto. Monitor data 434, in some examples, may include statistics describing storage system object access activity associated with, for example, virtual memory, file systems, and/or individual data storage devices. In some examples, some of monitor data 434 may be correlated with individual storage system objects so that one or more characteristics of previous accesses of the objects may be determined. Examples of Unix®-based monitor commands 432 may include, but are not limited to, "vxfsstat" (a diagnostic and tuning file system command), "vmstat" (an OS virtual memory statistics command), "iostat" (an OS storage input/output statistics command), and/or "sar" (an OS monitor command that provides the contents of several cumulative activity counters).

As depicted in FIG. 4, in some embodiments, statistics processor 404 may receive raw statistics 440 that includes the characteristics of the previous accesses provided in the statistics (e.g., file-listing data 414, log data 424, and/or monitor data 434) received by statistics collector 402. Further, in some examples, statistics processor 404 may process raw statistics 440 to produce previous access characteristics 450 having a form usable by model generation module 106. For example, statistics processor 404 may eliminate or discard some portion of raw statistics 440. For example, duplicative information related to the same access of the same storage system object may be discarded to prevent overrepresentation of that access in previous access characteristics 450. Also, some of raw statistics 440 may be irrelevant (e.g., not useful as input) to model generation module 106. For example, data regarding previous accesses predating some particular date and time may be not be important, as model generation module 106 may limit characteristics regarding previous accesses to those accesses that have occurred within some previous time span (e.g., within the last day, five days, week, month, and so on).

Also, in some embodiments, statistics processor 404 may supplement missing portions of raw statistics 440 that may be expected or required by model generation module 106 to perform its tasks. For example, a date and time of a particular access of a storage system object, such as a file, may be known, but the particular type of access (e.g., a read access or write access) or the number of accesses that occurred around that time, may be missing from raw statistics 440. In some examples, statistics processor 404 may detect such an omission, and may supplement raw statistics 440 or previous access characteristics 450. In some embodiments, statistics processor 404 may use data from other accesses for that same file, or other files of that same type by the same application (e.g., copying data values, averaging data values, etc.) to fill in the missing data.

In some examples, previous access characteristics 450, as produced by statistics processor 404, may identify each storage system object (e.g., file name, globally unique identifier, or the like) accessed during a particular prior time period, along with a date and time of the access, and other data describing, or otherwise associated with, the access. Consequently, in some embodiments, previous access characteristics 450 may represent, or be presented as, time series data describing each access of each storage system object stored in at least one storage tier 122 of data storage system 120.

Figure 5:
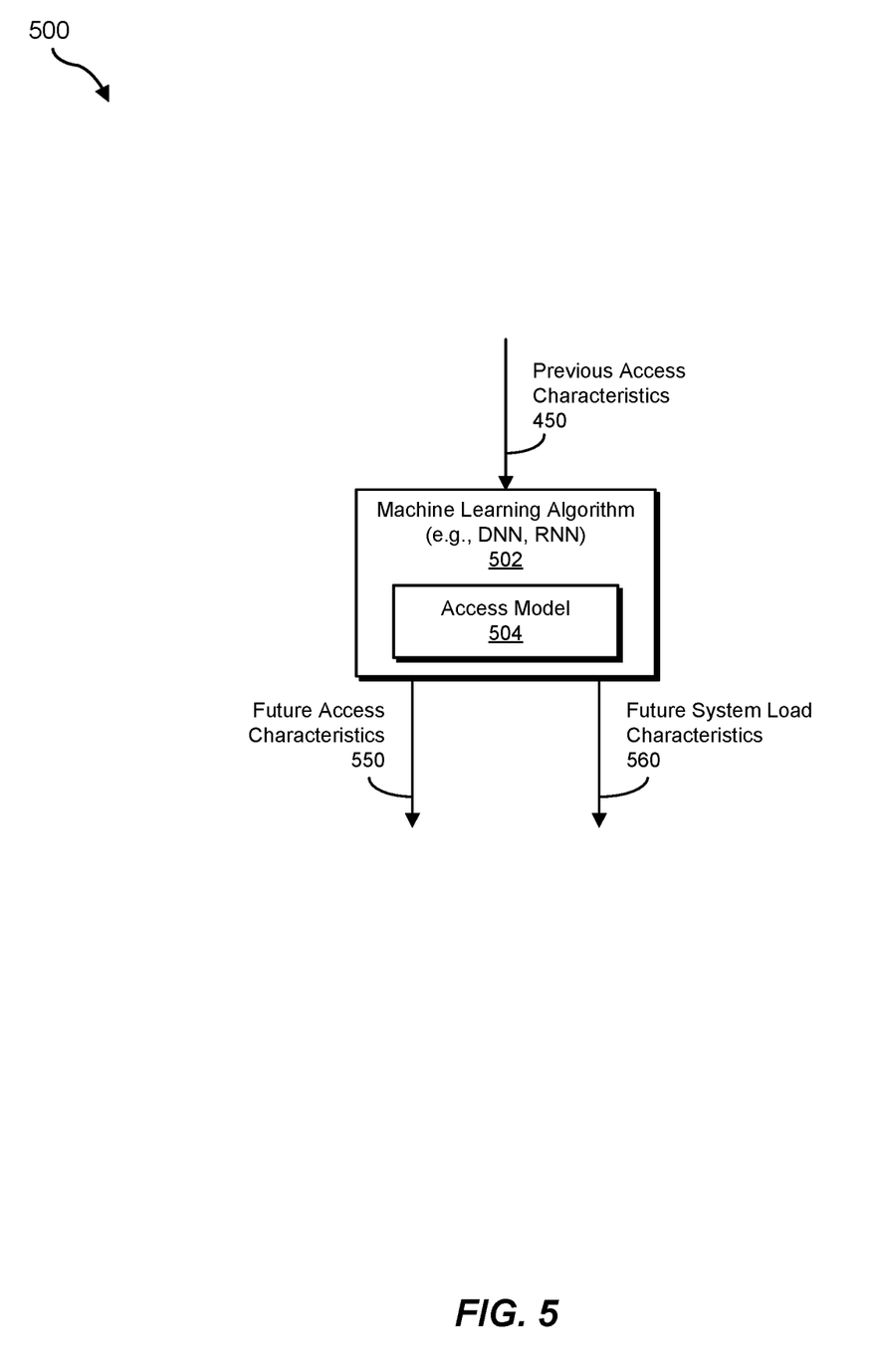
FIG. 5 is a flow diagram of example operations for generating a model from characteristics of previous accesses to predict characteristics of future accesses, as well as to predict future system loads.

FIG. 5 is a flow diagram of example operations 500 for generating an access model 504 from previous access characteristics 450 to predict future access characteristics 550 of each storage system object, as well as future system load characteristics 560 of data storage system 120. As depicted in FIG. 5, operations 500 may include the use of a machine learning algorithm 502, which in some examples may be incorporated in model generation module 106.

As illustrated in FIG. 5, in some examples, access model 504 may be represented or incorporated within machine learning algorithm 502 (e.g., by way of weights employed at the nodes of a neural network). However, in other embodiments, access model 504 may logically reside outside machine learning algorithm 502. In some examples, machine learning algorithm 502 may be a deep neural network (DNN), a recurrent neural network (RNN), a hybrid RNN/DNN network, or some other neural network. Generally, a neural network may include a number of layers of neural nodes, include a (first) input layer that receives input from an external source, a (last) output layer that provides the output from the network, and one or more hidden (intermediate) layers between the input layer and the output layer. As employed herein, a DNN may be a neural network with a relatively large number of hidden layers. Further, while a feedforward neural network is a neural network in which results from one layer are forwarded to the next layer, resulting in no circular paths of data within the network, an RNN provides at least one circular path, such as by way of presenting a result from one layer as input to an earlier layer (e.g., a layer closer to the input layer). In at least some examples, RNNs may facilitate prediction of future values of one or more variables based on immediately preceding values of the same variables. Moreover, in some embodiments, by combining an RNN with a DNN, the resulting hybrid neural network may facilitate prediction of a particular future time period (e.g., the next time period, such as a day) based on a significant plurality of previous time periods (e.g., time series data covering the previous five days, the previous seven days, or the like).

In some embodiments, machine learning algorithm 502 may be a supervised or unsupervised pattern recognition and/or prediction algorithm that learns previous access patterns for each of the storage system objects in data storage system 120 based on previous access characteristics 450. Consequently, machine learning algorithm 502, in some examples, may generate access model 504 (e.g., by way of weights in a neural network) that represents the learned access patterns. Machine learning algorithm 502, using access model 504, may then generate future access characteristics 550, in at least some embodiments. In some examples, future access characteristics 550 may include a pattern of predicted future accesses over a particular future time period (e.g., a predicted number of times accessed during the next day, week, etc.) for each of the storage system objects. In some embodiments, future access characteristics 550 may include other information for each of the storage system objects, possibly including, but not limited to, a type of each object, a size of each object, etc.

Moreover, in some embodiments, machine learning algorithm 502 may update access model 504 continually or periodically based on new previous access characteristics 450 received from statistics collection module 104. For example, presuming machine learning algorithm generates access model 504 using the previous five days' worth of previous access characteristics 450 to predict the next day's future access characteristics 550, statistics collection module 104 may then provide the actual access characteristics of the next day as additional previous access characteristics 450 to update access model 504 (e.g., thus incorporating six days of previous access characteristics 450) to generate future access characteristics 550 for the following day. In some embodiments, access model 504 may be updated daily, or once per any other time period.

In some embodiments, based on access model 504, machine learning algorithm 502 may also generate future system load characteristics 560 for data storage system 120, or for system 100 or 200 more generally. In some examples, further system load characteristics 560 may include one or more time predicted periods (e.g, before or within the time period to which the predicted future access characteristics 550 apply) of high and/or low activity load. Accordingly, periods of low activity load may be exploited to move one or more storage system objects from its current storage tier 122 to its next storage tier 122.

Figure 6:
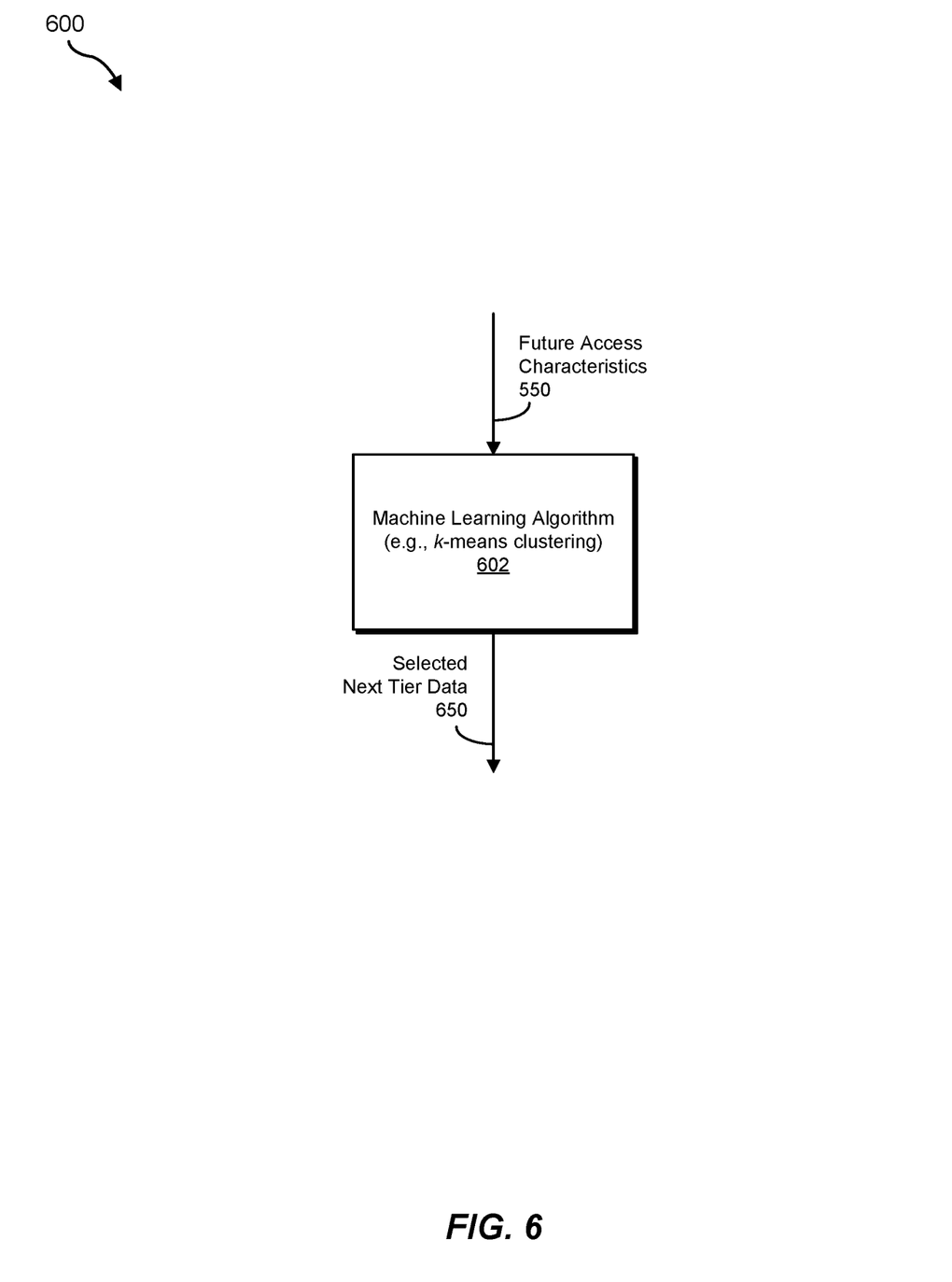
FIG. 6 is a flow diagram of example operations for selecting a storage tier for each storage system object based on predicted future access characteristics.

FIG. 6 is a flow diagram of example operations 600 for selecting a storage tier 122 for each storage system object based on predicted future access characteristics 550. As FIG. 6 illustrates, operations 600 may employ a machine learning algorithm 602 (e.g., different from machine learning algorithm 502 of FIG. 5), which in some embodiments may be included in tier selection module 108. In some examples, machine learning algorithm 602 may be a supervised or unsupervised clustering algorithm (e.g., a k-means clustering algorithm) that receives future access characteristics 550 (e.g., predicted access pattern over a predetermined future time period, possibly along with the size, type, etc.) for each of the storage system objects, and that groups the storage system objects according to similarity in access patterns during the future time period. In some embodiments, machine learning algorithm 602 may be an unsupervised algorithm that determines the number of groups (and possibly the number of storage tiers 122) into which the storage system objects are to be grouped or clustered. In other embodiments, a system operator or other user may determine a particular number of groups, a maximum number of groups, or a range of numbers of groups into which supervised machine learning algorithm 602 may apportion the storage system objects.

Based on future access characteristics 550, in some examples, machine learning algorithm 602 produces selected next tier data 650, which may assign each storage system object to a particular storage tier 122 for the next time period (e.g., the next day). In some examples, selected next tier data 650 may be based on the grouping that machine learning algorithm 602 performs, as described above. For example, each group or cluster into which machine learning algorithm 602 groups the storage system objects may corresponding with a storage tier 122 or group of storage tiers 122.

Figure 7:
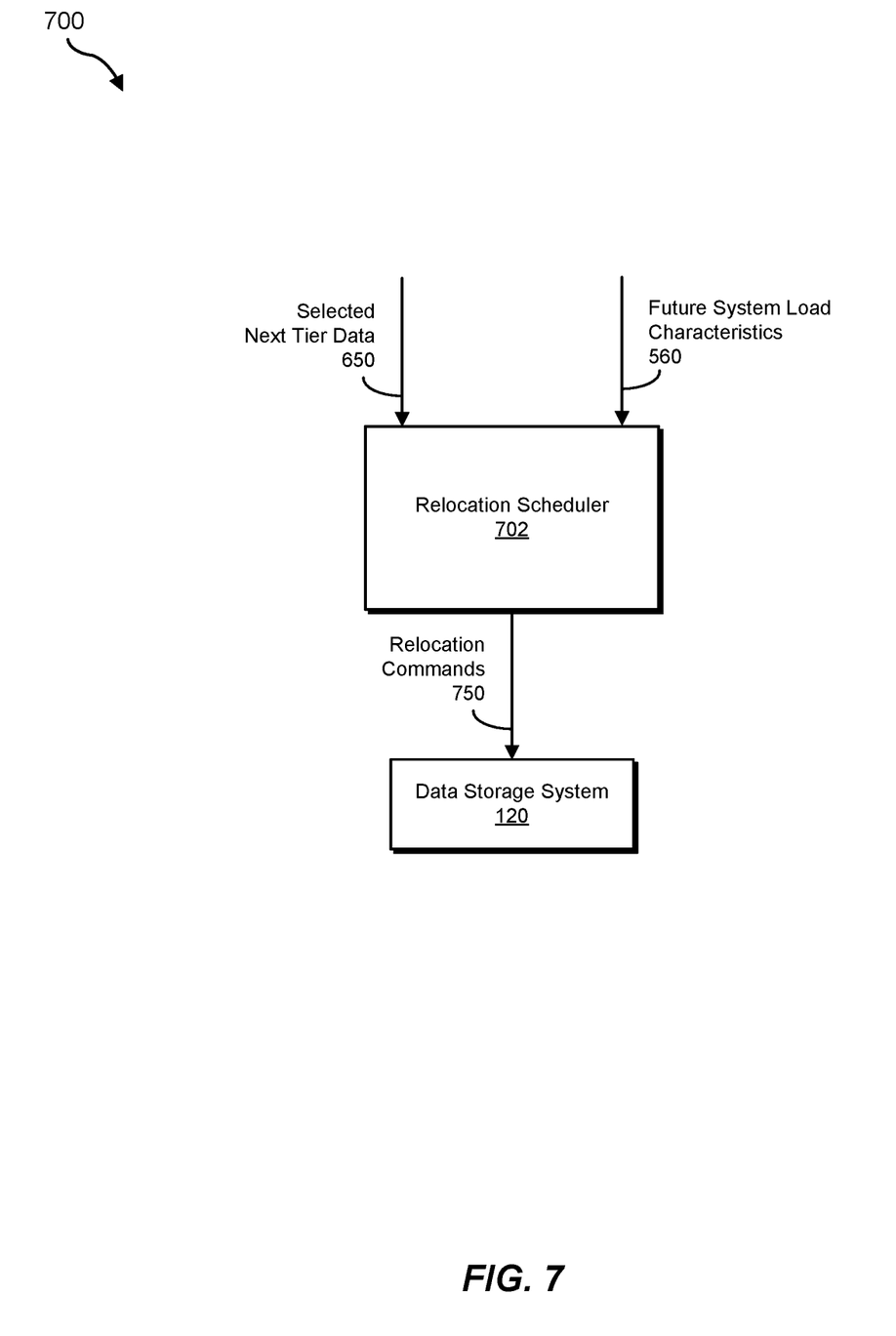
FIG. 7 is a flow diagram of example operations for relocating storage system objects based on selected storage tiers and predicted future system loads.

FIG. 7 is a flow diagram of example operations 700 for relocating storage system objects based on selected storage tiers 122 and predicted future system loads. As FIG. 7 depicts, operations 700 may include the use of a relocation scheduler 702 that, in some examples, may be included in relocation module 110. In some embodiments, relocation scheduler 702 may receive selected next tier data 650 (e.g., from machine learning algorithm 602 of tier selection module 108) and future system load characteristics 560 (e.g., from machine learning algorithm 502 of model generation module 106). Based on this data, in some embodiments, relocation scheduler 702 may issue a plurality of relocation commands 750 to data storage system 120 to relocate, as necessary, each of the storage system objects to its assigned storage tier 122 (e.g., as specified in selected next tier data 650). Additionally, relocation scheduler 702, in some examples, may time the issuance of relocation commands 750 (e.g., during periods of light activity in data storage system 120 and/or system 100 or 200) based on predicted activity load information provided in future system load characteristics 560, as described above.

In some embodiments, relocation scheduler 702 may compare the current storage tier 122 in which each storage system object is stored to that object's selected next storage tier 122, and issue relocation commands 750 for only those storage system objects that are not currently located in their selected next storage tier 122.

As explained above in connection with FIGS. 1-7, systems and methods for automatic storage tiering may facilitate efficient alignment of storage system objects (e.g., files, file directories, data blocks, data objects, and/or the like) among multiple storage tiers of a data storage system by predicting future accesses to the objects during a future time period based on previous accesses to those same objects over some prior time period. In some examples, a machine learning algorithm may generate an access model that provides the future access predictions, and then may continually update that model over time, thus possibly increasing the accuracy of the predicted accesses. The use of such systems and methods, in some embodiments, may not only relieve an operator or customer of the burdensome task of manually and repeatedly updating storage polices that may determine which storage tier each storage system object is to be stored, but may result in a more effective overall computing and storage system in terms of increased computing system performance and throughput (e.g., by placing more frequently accessed objects in higher storage tiers), reduced data storage cost efficiency (e.g., by storing less frequently accessed objects in lower storage tiers), and/or less communication network bandwidth consumption (e.g., by placing less frequently accessed objects in remotely located tiers and more frequently accessed objects in locally located tiers).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatic storage tiering, at least a portion of the method being performed by a computing device comprising at least one processor, the method comprising:
   receiving characteristics of previous accesses to storage system objects stored in a data storage system comprising multiple storage tiers;
   generating, using a first machine learning algorithm and based on the characteristics of previous accesses to the storage system objects, a model that:
      predicts characteristics of future accesses to the storage system objects during a future time period; and
      predicts characteristics of future activity loads on the data storage system, wherein the characteristics of future activity loads comprise at least one predicted time period of reduced activity load on the data storage system;
   selecting, using a second machine learning algorithm comprising an unsupervised k-means clustering algorithm that is different from the first machine learning algorithm, a next storage tier of the multiple storage tiers in which each of the storage system objects is to be stored during the future time period, wherein the unsupervised k-means clustering algorithm clusters the storage system objects into a number of groups associated with the multiple storage tiers according to similarity in access patterns during the future time period based on the characteristics of future accesses to the storage system objects predicted by the model, wherein the unsupervised k-means clustering algorithm determines the number of groups, wherein the number of groups is not equal to a number of tiers of the multiple storage tiers of the data storage system in which the storage system objects are to be stored; and
   relocating at least some of the storage system objects from a current storage tier to the next storage tier selected for each of the at least some of the storage system objects during the at least one predicted time period of reduced activity load.

2. The computer-implemented method of claim 1, wherein:
   receiving the characteristics of previous accesses to the storage system objects comprises issuing file-listing commands; and
   the characteristics of previous accesses to the storage system objects comprise, for each of at least some of the storage system objects, at least one of:
      a last access time for the storage system object; or
      a last modification time for the storage system object.

3. The computer-implemented method of claim 1, wherein:
   receiving the characteristics of previous accesses to the storage system objects comprises receiving data from a least one of:
      a file change log; or
      an intelligent infrastructure management system; and
   the characteristics of previous accesses to the storage system objects comprise, for each of at least some of the previous accesses of at least some of the storage system objects, at least one of:
      a timestamp indicating when the previous access occurred;
      an identity of an entity that initiated the previous access; or
      an amount of data transferred during the previous access.

4. The computer-implemented method of claim 1, wherein:
   receiving the characteristics of previous accesses to the storage system objects comprises issuing operating system monitoring commands; and
   the characteristics of previous accesses to the storage system objects comprise statistics describing previous activity involving at least one of:
      virtual memory;
      file systems; or
      data storage devices.

5. The computer-implemented method of claim 1, wherein:
   the first machine learning algorithm comprises an unsupervised pattern prediction algorithm that:
      learns, based on at least some of the characteristics of previous accesses to the storage system objects, previous access patterns to the storage system objects; and
      generates the model based on the previous access patterns to the storage system objects.

6. The computer-implemented method of claim 5, further comprising:

processing the at least some of the characteristics of previous accesses to the storage system objects to generate time series data as input for the first machine learning algorithm.

7. The computer-implemented method of claim 6, wherein processing the at least some of the characteristics of previous accesses to the storage system objects comprises:
supplying data missing from one or more of the at least some of the characteristics of previous accesses to the storage system objects.

8. The computer-implemented method of claim 7, wherein:
supplying data missing from one or more of the at least some of the characteristics of previous accesses comprises supplying average data values for at least one of the data missing from the one or more of the at least some of the characteristics of previous accesses.

9. The computer-implemented method of claim 1, wherein:
the first machine learning algorithm comprises at least one of:
a deep neural network; or
a recurrent neural network.

10. The computer-implemented method of claim 1, wherein:
the first machine learning algorithm updates the model after each of a plurality of time periods based on the characteristics of previous accesses to the storage system objects over the corresponding time period of the plurality of time periods.

11. The computer-implemented method of claim 1, wherein:
the characteristics of future accesses to the storage system objects comprise a number of predicted accesses for each of the storage system objects during the future time period.

12. The computer-implemented method of claim 1, wherein:
the number of groups is equal to a number of tiers of the multiple storage tiers of the data storage system in which the storage system objects are to be stored.

13. The computer-implemented method of claim 1, wherein the storage system objects comprise at least one of:
data blocks;
data objects;
files;
portions of files; or
file directories.

14. A system for automatic storage tiering, the system comprising:
a statistics collection module, stored in memory, that receives characteristics of previous accesses to storage system objects stored in a data storage system comprising multiple storage tiers;
a model generation module, stored in memory, that generates, using a first machine learning algorithm and based on the characteristics of previous accesses to the storage system objects, a model that:
predicts characteristics of future accesses to the storage system objects during a future time period; and
predicts characteristics of future activity loads on the data storage system, wherein the characteristics of future activity loads comprise at least one predicted time period of reduced activity load on the data storage system;
a tier selection module, stored in memory, that selects, using a second machine learning algorithm comprising an unsupervised k-means clustering algorithm that is different from the first machine learning algorithm, a next storage tier of the multiple storage tiers in which each of the storage system objects is to be stored during the future time period, wherein the unsupervised k-means clustering algorithm clusters the storage system objects into a number of groups associated with the multiple storage tiers according to similarity in access patterns during the future time period based on the characteristics of future accesses to the storage system objects predicted by the model, wherein the unsupervised k-means clustering algorithm determines the number of groups, wherein the number of groups is not equal to a number of tiers of the multiple storage tiers of the data storage system in which the storage system objects are to be stored;
a relocation module, stored in memory, that relocates at least some of the storage system objects from a current storage tier to the next storage tier selected for each of the at least some of the storage system objects during the at least one predicted time period of reduced activity load; and
at least one physical processor that executes the statistics collection module, the model generation module, the tier selection module, and the relocation module.

15. A non-transitory computer-readable medium comprising one or more computer-executable instructions that, when executed by at least one processor of a computing device, cause the computing device to:
receive characteristics of previous accesses to storage system objects stored in a data storage system comprising multiple storage tiers;
generate, using a first machine learning algorithm and based on the characteristics of previous accesses to the storage system objects, a model that:
predicts characteristics of future accesses to the storage system objects during a future time period; and
predicts characteristics of future activity loads on the data storage system, wherein the characteristics of future activity loads comprise at least one predicted time period of reduced activity load on the data storage system;
select, using a second machine learning algorithm comprising an unsupervised k-means clustering algorithm that is different from the first machine learning algorithm, a next storage tier of the multiple storage tiers in which each of the storage system objects is to be stored during the future time period, wherein the unsupervised k-means clustering algorithm clusters the storage system objects into a number of groups associated with the multiple storage tiers according to similarity in access patterns during the future time period based on the characteristics of future accesses to the storage system objects predicted by the model, wherein the unsupervised k-means clustering algorithm determines the number of groups, wherein the number of groups is not equal to a number of tiers of the multiple storage tiers of the data storage system in which the storage system objects are to be stored; and
relocate at least some of the storage system objects from a current storage tier to the next storage tier selected for each of the at least some of the storage system objects during the at least one predicted time period of reduced activity load.

16. The computer-implemented method of claim 1, wherein:

the model further predicts future system load characteristics based on the characteristics of previous accesses to the storage system objects; and the future system load characteristics comprise the at least one predicted time period of reduced activity load on the data storage system.

17. The computer-implemented method of claim 16, wherein the future system load characteristics further comprise one or more at least one predicted time period of increased activity load on the data storage system.

18. The computer-implemented method of claim 10, wherein the plurality of time periods comprises a plurality of consecutive days.

19. The computer-implemented method of claim 1, wherein:

the number of groups is limited to a predetermined range of numbers of groups.

* * * * *